(12) United States Patent
Mechtel et al.

(10) Patent No.: US 6,413,446 B1
(45) Date of Patent: Jul. 2, 2002

(54) ANTIFOULING AGENTS, THEIR PRODUCTION AND USE, AND ANTIFOULING COATING PRODUCED THEREFROM

(75) Inventors: Markus Mechtel, Köln; Michael Mager; Karl-Heinz Käsler, both of Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/336,476

(22) Filed: Jun. 18, 1999

(30) Foreign Application Priority Data

Jun. 25, 1998 (DE) .......................... 198 28 256

(51) Int. Cl.$^7$ ........................ C09K 3/00; C09D 183/00; A01N 55/10; B05D 3/02
(52) U.S. Cl. .................... 252/181; 252/181; 106/287.1; 106/287.12; 106/287.13; 427/387; 428/447; 428/907
(58) Field of Search ................................. 252/175, 180; 427/387; 428/447, 907; 106/287.1, 287.12, 287.13, 287.16; 556/434

(56) References Cited

U.S. PATENT DOCUMENTS

| | | | |
|---|---|---|---|
| 4,025,693 A | 5/1977 | Milne | 428/447 |
| 4,904,504 A | 2/1990 | Isozaki | 427/387 |
| 4,910,252 A | 3/1990 | Yonehara et al. | 524/730 |
| 5,017,322 A | 5/1991 | Brooks | 264/255 |
| 5,298,060 A | 3/1994 | Harakal et al. | 106/15.05 |
| 5,663,215 A | 9/1997 | Milligan | 523/122 |
| 5,880,305 A * | 3/1999 | Kraus et al. | 556/459 |
| 5,958,116 A * | 9/1999 | Kishihara et al. | 106/15.05 |
| 6,005,131 A * | 12/1999 | Jentsch et al. | 556/434 |
| 6,136,939 A * | 10/2000 | Mager et al. | 528/33 |
| 6,224,946 B1 * | 5/2001 | Kirchmeyer et al. | 427/387 |

FOREIGN PATENT DOCUMENTS

| | | |
|---|---|---|
| DE | 196 03 241 C1 * | 7/1997 |
| DE | 196 06 011 | 8/1997 |
| DE | 197 11 650 C1 * | 6/1998 |
| WO | 98/38251 | 9/1998 |

OTHER PUBLICATIONS

Mater. Lett. 13, (month unavailable) 1992, pp. 261–262, Sitar et al, Luminescence and Lattice and parameter of cubic gallium nitride.
ACS Symp. Ser. 585 (month unavailable) 1995) p. 125, Wei et al, Vingy–Polymer–Modified Hybrid Material and Photoacid–Catalyzed Sol–Gel Reactions.
Advanced Materials, 6, (month unavailable0 1994, pp. 372–374, Wei et al, Phtotochemical Synthesis of Polyacrylate–Silica Hybrid Sol–Gel Materials Catalyzed by Photoacids.

* cited by examiner

*Primary Examiner*—Joseph D. Anthony
(74) *Attorney, Agent, or Firm*—Joseph C. Gil; Richard E. L. Henderson; Diderico van Eyl

(57) ABSTRACT

The present invention relates to antifouling agents containing (A) at least one multifunctional carbosilane and/or carbosiloxane of formula (I)

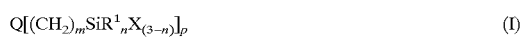

$$Q[(CH_2)_m SiR^1{}_n X_{(3-n)}]_p \qquad (I)$$

and/or a partial condensation product thereof,
wherein
each $R^1$ is independently a $C_1$–$C_{18}$ alkyl and/or $C_6$–$C_{20}$ aryl,
X is OH, $C_1$–$C_4$ alkoxy, $C_6$–$C_{20}$ aryloxy, or $C_1$–$C_6$ acyloxy,
n is 0 to 2,
m is 2 to 6,
p is an integer $\geq 2$, and
Q is either (i) a linear or cyclic silane or siloxane or (ii) an unsubstituted hydrocarbon or a hydrocarbon in which at least one carbon atom is substituted with at least one member of the group consisting of O, N, S, and P, and optionally
(B) one or more alkoxysilanes,
(C) an organic solvent and/or water,
(D) a catalyst,
(E) inorganic nanoparticles, and/or
(F) other additives.

12 Claims, No Drawings

ANTIFOULING AGENTS, THEIR PRODUCTION AND USE, AND ANTIFOULING COATING PRODUCED THEREFROM

BACKGROUND OF THE INVENTION

The present invention relates to antifouling agents, to methods of producing and using them, and to antifouling coatings produced therefrom. Antifouling coatings serve for the protection of objects from fouling, particularly ship's hulls, screens, nets, buildings, canal installations, and signaling installations which come into contact with seawater or brackish water.

The occurrence of fouling is a serious problem, particularly for ships, since the frictional resistance is thereby increased and operating costs are considerably increased as a result of increased energy consumption and frequent dry dock maintenance. For this reason, antifouling coatings have long been used to prevent fouling by algae, barnacles, sedentaria, mussels, or other organisms.

A distinction can be made in principle between antifouling coatings that contain biocides and antifouling coatings that do not contain biocides.

Antifouling coatings that contain biocides constitute the state of the art. Organisms that result in fouling are killed off by the biocides. The usual antifouling biocides are organic tin compounds or copper, antimony, and bismuth compounds. The disadvantage of these biocides is their restricted environmental compatibility. Heavy metal biocides are particularly problematical, since these cause contamination of seawater and of the sea bed, particularly in the region of harbors.

Biocide-free antifouling coatings possess anti-adhesion properties intended to physically prevent the attachment of marine organisms. For example, the prior art comprises antifouling coatings based on liquid organosilicone, liquid paraffins, or fluorinated oils in combination with organopolysilicone polymers, particularly silicone elastomers (see U.S. Pat. No. 5,298,060 and DE-A 2,601,928). However, the effectiveness of antifouling coatings such as these is limited. A further disadvantage is their low mechanical loading capacity, which is frequently accompanied by unsatisfactory adhesion to anti-corrosion coatings, due to which the application of an additional primer coat may become necessary.

Copolymers of organic polymers and silicone polymers are also known from the prior art. U.S. Pat. No. 4,910,252 and WO 93 13179 describe biocide-free antifouling coatings which contain trialkoxysilane-group-containing polymers, preferably acrylates and linear siloxane polymers. EP 329 375 claims a coating composition of silicone polymers and polyurethane and/or polyurea. WO 98 38251 describes organic/inorganic hybrid materials produced from at least one organic polymer, inorganic (nano)particles and polyfunctional organosilanes.

The mode of action of the abovementioned antifouling coatings is based on the low surface tension of silicone-containing coatings and/or the more or less controlled release of slip additives which are intended to prevent the attachment of marine organisms.

The underlying object of the present invention is, therefore, to provide improved anti-fouling agents, which do not have the afore-mentioned disadvantages of known antifouling agents and the antifouling properties of which can be achieved even without biocides.

Surprisingly, it has now been found that this spectrum of requirements is fulfilled by antifouling agents that contain at least one multifunctional carbosilane and/or carbosiloxane (A), and which also optionally contain at least one additional alkoxysilane (B), a solvent-(C), catalyst (D), and/or inorganic nanoparticles (E), and optionally other additives (F).

The antifouling agents according to the invention cure at room temperature and are characterized by good adhesion to anti-corrosion coatings and by a high mechanical loading capacity. An additional primer coat is thus not necessary. The antifouling agents according to the invention exhibit a fouling-inhibiting effect and effectively protect objects from fouling, particularly ships' hulls, screens, nets, buildings, canal installations, and signaling installations that come into contact with seawater or brackish water.

SUMMARY OF THE INVENTION

The present invention therefore relates to antifouling agents comprising (A) at least one multifunctional carbosilane and/or carbosiloxane of the general formula (I)

$$Q[(CH_2)_m SiR^1_n X_{(3-n)}]_p \qquad (I)$$

and/or a partial condensation product thereof, wherein

$R^1$ is a $C_1$–$C_{18}$ alkyl and/or $C_6$–$C_{20}$ aryl, wherein $R^1$ may represent radicals which are identical or different within the molecule,
X is OH, $C_1$–$C_4$ alkoxy, $C_6$–$C_{20}$ aryloxy, or $C_1$–$C_6$ acyloxy, (preferably OH, methoxy, or ethoxy),
n is 0 to 2,
m is 2 to 6,
p is an integer $\geq 2$, and
Q is either (i) a linear or cyclic silane or siloxane or (ii) an unsubstituted hydrocarbon or a hydrocarbon in which at least one carbon atom is substituted with at least one member of the group consisting of O, N, S, and P, (B) optionally, one or more alkoxysilanes,
(C) optionally, an organic solvent and/or water,
(D) optionally, a catalyst,
(E) optionally, inorganic nanoparticles, and
(F) optionally, other additives.

DETAILED DESCRIPTION OF THE INVENTION

Multifunctional carbosilanes (A) in the sense of the present invention are silanes of general formula (II)

$$R^2_{4-p}Si[(CH_2)_m SiR^1_n X'_{(3-n)}]_p \qquad (II)$$

or partial condensation products thereof, wherein

p is 4, 3, or 2 (preferably 4),
X' is $C_1$–$C_4$ alkoxy or $C_6$–$C_{20}$ aryloxy (preferably methoxy or ethoxy),
$R^2$ denotes $C_1$–$C_{18}$ alkyl and/or $C_6$–$C_{20}$ aryl, and m, n, and $R^1$ have the meanings given above.

In another embodiment of the invention, multifunctional carbosiloxanes (A) contain at least two components selected from monofunctional siloxane units M of general formula $R_3SiO_{1 2}$, difunctional siloxane units D of general formula $R_2SiO2/2$, and/or trifunctional siloxane units T of general formula $RSiO_{3/2}$, and optionally also contain tetrafunctional siloxane units Q of general formula $SiO_{4/2}$ and/or condensation products and/or partial condensation products thereof. These compounds may be substituted with at least one member of the group O, N, S, and P. In this context R denotes a $C_1$–$C_{18}$ alkyl and/or $C_6$–$C_{20}$ aryl, wherein R may represent radicals which are identical or different within the molecule.

The siloxanes according to the invention preferably have a (number average) molecular weight between 300 and 5000.

In one preferred embodiment, multifunctional carbosiloxanes (A) are compounds of formula (III)

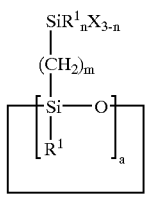

(III)

or (partial) condensation products thereof, wherein a is 3 to 6 (preferably 4), and $R^1$, X, m and n have the meanings given in formula (I).

Compounds that are particularly preferred for the antifouling agents according to the invention are those of formulas (IV) and/or (V)

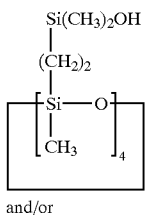

(IV)

and/or

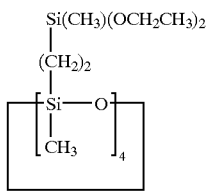

(V)

or partial condensation products thereof.

The multifunctional carbosilanes and/or carbosiloxanes are preferably prepared by the method described in DE-A 1,960,3241 and DE 1,971 1650, namely by the hydrosilylation of the corresponding vinyl compounds with a chlorosilane and subsequent hydrolysis and/or alcoholysis.

However, multifunctional carbosilanes (A) may also be heterocyclic compounds, such as, for example, a compound of formula (VI)

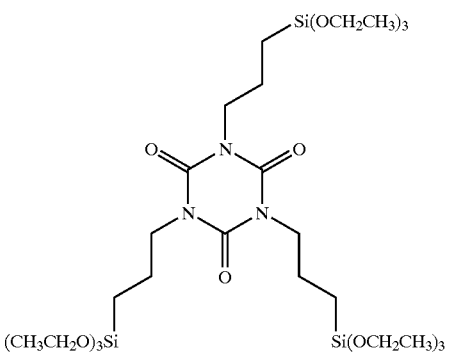

This tris[3-(trimethoxysilyl)propyl]isocyanurate of formula (VI) is obtainable from the Witco company under the trade name Silquest® Y-11597.

Multifunctional carbosilanes (A) may also be the reaction products of what are preferably aliphatic polyols, such as pentaerythritol 2,2-bis(hydroxymethyl)-1,3-propanediol, with silanes of formula (VII)

$$ONC-(CH_2)_m SiR^1_n X_{(3-n)} \quad (VII)$$

wherein $R^1$, X, m, and n have the meanings given for formula (I), and/or reaction products of what are preferably aliphatic polyisocyanates, such as polyisocyanates based on hexamethylenediamine ("HDI"), with silanes of formula (VIII)

$$R^3NH-(CH_2)_m SiR^1_n X_{(3-n)} \quad (VIII)$$

wherein $R_1$, X, m, and n have the meanings given in formula (I) and $R^3$ denotes a $C_1$–$C_4$ alkyl radical.

The alkoxysilanes (B) are particularly preferably used in the form of (partial) condensates.

Condensation products or partial condensation products in the sense of the present invention are to be understood as compounds which are formed, for example, by the reaction of two radicals X of general formula (I) with the separation of water or alcohol.

Alkoxysilanes (B) in the sense of the present invention are compounds of general formula (IX)

$$R^4_b SiY_{(4-b)} \quad (IX)$$

wherein

$R^4$ are monovalent $C_1$–$C_{14}$ alkyl or $C_6$–$C_{20}$ aryl radicals that are identical or different within the molecule and that are optionally substituted with at least one member of the group consisting of O, N, S, and P, Y is a hydrolyzable group (preferably a $C_1$–$C_8$ alkoxy or $C_2$–$C_8$ acyloxy group, most preferably a $C_1$–$C_2$ alkoxy group), and b is 0, 1, 2, or 3 (preferably 0 or 1),

and/or a partial condensation product of at least one silane of formula (IX).

The antifouling agent according to the invention contains, as the preferred alkoxysilane (B), tetraethoxysilane, methyltrimethoxysilane and/or methyltriethoxy-silane (most preferably tetraethoxysilane) or a partial condensation product of said silanes (preferably of tetraethoxysilane). However, other silanes of formula (IX), mixtures of silanes such as these, partial condensation products of these silanes, or partial condensation products of mixtures of said silanes can also be used. Examples of suitable silanes of formula (IX) include Si(OR')$_4$, R"Si(OR')$_3$, and R"Si(OOCR')$_3$, wherein R' and R", independently of each other, denote methyl, ethyl, (iso)propyl, (iso)butyl, (iso)pentyl, (iso)hexyl, or (iso)octyl.

Solvent (C) is preferably an organic solvent which is miscible with water, such as isopropanol, optionally in admixture with water, with the latter being preferred.

All condensation catalysts known in silicone chemistry can be used as catalysts (D), including those described by W. Noll, in *Chemie und Technologie der Silikone*, Chapter 5.4, page 179, Verlag Chemie, Weinheim, 1968. An acid is preferably used as the catalyst, most preferably para-toluenesulfonic acid.

The antifouling agent according to the invention may additionally contain inorganic nanoparticles (E), and/or other additives (F).

Examples of inorganic nanoparticles (E) in the sense of the present invention include oxides or hydrated oxides of metals or semi-metals with an average (number average) particle diameter of 5 to 100 nm (preferably 5 to 50 nm), as determined by ultracentrifugation. Examples of nanoparticles according to the invention include silica sols ($SiO_2$), boehmite sols (Al(O)OH), and/or $TiO_2$ sols. The inorganic nanoparticles according to the invention can also be produced in situ by hydrolysis of suitable molecular precursors, such as the corresponding metal or transition metal alcoholates or acetylacetonates and/or partial hydrolysates thereof. The inorganic nanoparticles can also be surface-modified by known methods, for example, by reaction with hexamethyldisilazane. The most preferred inorganic nanoparticles are silica sols that are dispersed in an organic solvent and that have an average (number average) particle size of 5 to 100 nm (most preferably an average particle size of 5 to 50 nm). The particle size is determined by ultracentrifugation.

The antifouling agents according to the invention may contain, as other additives (F), inorganic pigments, organic pigments or colorants, which are preferably insoluble in (sea)water, and/or customary adjuvant substances such as extenders, solvents, plasticizers, catalysts, inhibitors, bonding agents, lacquer additives, and/or customary dispersing agents.

It is also possible, of course, to admix known release or slip additives, such as liquid organosilicones, liquid paraffins, and/or fluorinated oils, with the antifouling agents according to the invention for use in antifouling applications.

Biocides such as triazoles, imidazoles, naphthalene derivatives, and the like, may also be added to the antifouling agent. However, the advantages of the mixture according to the invention are achieved even without these components.

The antifouling agents according to the invention are preferably prepared in organic solvents. However, it is also possible to prepare the agent according to the invention as an aqueous formulation. In this case it is advantageous if any components (E) to (F) that may be contained in the agent according to the invention are likewise added as aqueous formulations or if they are compatible with the aqueous agent.

In one preferred embodiment of the invention, the antifouling agent according to the invention has the following composition:

(A) 2 to 100% by weight (preferably 10 to 70% by weight) of at least one multifunctional carbosilane and/or carbosiloxane, preferably a multifunctional carbosilane and/or carbosiloxane of formulas (II) to (V), most preferably a multifunctional carbosiloxane of formula (IV) and/or (V), or (partial) condensation products thereof, (B) 0 to 60% by weight (preferably 10 to 40% by weight) of at least one alkoxysilane, preferably an alkoxysilane of formula (IX), most preferably tetraethoxysilane or a condensation product of at least one silane of formula (IX), (C) 0 to 70% by weight (preferably 20 to 60% by weight) of at least one solvent, preferably a water-thinnable solvent, most preferably an organic solvent in admixture with water, (D) 0.01 to 2% by weight (preferably 0.02 to 1% by weight) of at least one catalyst, preferably an acid, most preferably para-toluenesulfonic acid, (E) 0 to 20% by weight (preferably 3–15% by weight) of inorganic nanoparticles, with an average (number average) particle diameter of 5 to 100 nm (preferably 5 to 50 nm), (F) 0 to 50% by weight (preferably 0 to 30% by weight) of other additives, with the proviso that the sum of components (A) to (F) amounts to 100% by weight.

The present invention also relates to the production of the agent according to the invention, wherein the individual components (A) to (F) are stirred with each other. The individual components can be stirred with each other in any desired sequence using the stirring and dispersion methods known in the lacquer industry until a homogeneous solution or dispersion is formed. It is advantageous for component (D) to be added as the final component and for the agent to be stirred at 15 to 20° C. for 30 to 90 minutes prior to application. In a preferred embodiment of the invention a hydrolyzate/condensate which is stable on storage is produced from components (B) to (D) with the addition of water. For the preparation of the hydrolyzate/condensate it is preferable for 0.2 to 0.7, preferably 0.4 to 0.6, moles of water to be added per mole of hydrolyzable group X of the silanes (B) of the general formula (IX). Details of the sol-gel process are for example provided by C. J. Brinker and W. Scherer in "Sol-Gel Science: The Physics and Chemistry of Sol-Gel Processing", Academic Press, New York (1990). After the reaction is complete, the solvent (C) used for the production of the hydrolyzate and the alcohol formed in the reaction of the alkoxysilane (B) can be partially distilled off and/or replaced by a different solvent. In this case the hydrolyzate of (B) to (D) is homogeneously mixed with components (A) and optionally components (E) and (F). The agent can be applied immediately.

The present invention further relates to the use of the antifouling agents according to the invention as an antifouling coating, and also relates to such antifouling coatings and to the production thereof.

Antifouling coatings produced using the agents according to the invention can be applied to the marine surface to be protected as a single fouling-preventing coating or brushed coating. The marine surfaces to be protected can also be provided with a primer coat comprising corrosion-preventing paints before the antifouling coating produced using the agent according to the invention is applied.

Application of the antifouling agent according to the invention to a fixed substrate is preferably effected by spraying, by dipping, by roller application, or by a brushing technique.

EXAMPLES

Example 1

37.4 g of tetraethoxysilane (TEOS), 30 g of isopropanol and 8.2 g of 0.1 N p-toluenesulphonic acid are added in succession with stirring to 39.4 g of a (partial) condensation product of 1,3,5,7-tetramethyl-1,3,5,7-tetra(2-diethoxymethylsilyl-ethylene)cyclotetrasiloxane in a beaker. The reaction mixture is stirred for 60 minutes. During the reaction time a slightly exothermic reaction takes place. The viscosity of the agent according to the invention is 15 mPa·s at 23° C. and the pot life is approx. 16 hours.

Example 2

31.5 g of tetraethoxysilane (TEOS), 38.7 g of isopropanol and 5.3 g of 0.1 N p-toluenesulphonic acid are added in succession to 24.5 g of a (partial) condensation product of 1,3,5,7-tetramethyl-1,3,5,7-tetra(2-hydroxydimethyl-silylethylene)-cyclotetrasiloxane at a temperature of 19° C. in a beaker. The reaction mixture is stirred for 60 minutes. The viscosity of the agent according to the invention is 14 mPa·s at 23° C. and the pot life is approx. 5 hours.

Example 3

12.1 g of tetraethoxysilane (TEOS), 29.6 g of isopropanol, 37.5 g of Organosol (from Bayer AG, a 30% colloidal solution of silicon dioxide in isopropanol) and 2.1 g of 0.1 N p-toluenesulphonic acid are added in succession with stirring at a temperature of 19° C. to 18.7 g of a (partial) condensation product of 1,3,5,7-tetramethyl-1,3,5,7-tetra(2-hydroxydimethyl-silylethylene)-cyclotetrasiloxane in a beaker. The reaction mixture is stirred at 19° C. for 60 minutes. The viscosity of the agent according to the invention is 13 mPa·s at 23° C. and the pot life is approx. 12 hours.

Example 4

4.1 Prehydrolyzate 1667 g of tetraethoxysilane (TEOS) and 2041 g of ethanol are initially introduced into a three-necked flask equipped with a stirrer, an internal thermometer, a reflux condenser and a dropping funnel and 291.5 g of 0.1 N aqueous toluenesulphonic acid are added with stirring. The reaction temperature rises to approx. 50° C. The reaction mixture is stirred for 24 hours. The hydrolyzate is stable on storage in a sealed container for at least 6 months.

4.2 Prehydrolyzate 114 g of tetraethoxysilane (TEOS), 330 g of Organosol (from Bayer AG, a 30% colloidal solution of silicon dioxide in isopropanol) and 337 g of ethanol are initially introduced into a three-necked flask equipped with a stirrer, an internal thermometer, a reflux condenser and a dropping funnel and 20 g of 0.1 N aqueous 4-toluenesulphonic acid are added with stirring. The reaction mixture is stirred for 24 hours. The hydrolyzate is stable on storage in a sealed container for at least 6 months at room temperature.

4.3 Prehydrolyzate 87.4 g of 0.05 N aqueous 4-toluenesulphonic acid are added with stirring to 500 g of tetraethoxysilane (TEOS) in a three-necked flask equipped with a stirrer, an internal thermometer, a reflux condenser and a dropping funnel. The reaction temperature rises to approx. 67° C. After approx. 25 minutes the initially cloudy reaction mixture becomes clear. When the temperature has once again fallen to 30° C., 100 g of 1-pentanol are added and ethanol is distilled off at 60° C. under a slight vacuum. During distillation a total additional 200 g of 1-pentanol are added dropwise. The hydrolyzate is adjusted to 30% by weight of solids with 1-pentanol. It is stable on storage at room temperature in a sealed container for at least 6 months.

Example 5

100 g of the prehydrolyzate from Example 4.1 are mixed with stirring with 66 g of a 75% solution (w/w) of a (partial) condensation product of 1,3,5,7-tetramethyl-1,3,5,7-tetra(2-hydroxydimethylsilylethylene)-cyclo-tetrasiloxane in n-butanol in a beaker. The agent according to the invention can be applied immediately. The pot life is approx. 45 minutes.

Example 6

100 g of the prehydrolyzate from Example 4.1 are mixed with stirring with 66 g of a (partial) condensation product of 1,3,5,7-tetramethyl-1,3,5,7-tetra(2-diethoxymethyl-silylethylene)cyclotetrasiloxane in a beaker. The agent according to the invention can be applied immediately. The pot life is approx. 12 hours.

Example 7

100 g of the prehydrolyzate from Example 4.2 are mixed with stirring with 40 g of a 75% solution (w/w) of a (partial) condensation product of 1,3,5,7-tetramethyl-1,3,5,7-tetra(2-hydroxydimethylsilylethylene)-cyclotetrasiloxane in n-butanol in a beaker. The agent according to the invention can be applied immediately. The pot life is approx. 12 hours.

Example 8

60 g of the prehydrolyzate from Example 4.3 are mixed with stirring with 80 g of a (partial) condensation product of 1,3,5,7-tetramethyl-1,3,5,7-tetra(2-diethoxymethyl-silylethylene)cyclotetrasiloxane and 18 g of a 0.1 molar solution of 4-toluenesulphonic acid in ethanol in a beaker. The agent according to the invention can be applied immediately. The pot life is approx. 48 hours.

Example 9

The reaction according to the invention of a polyol with gamma-isocyanatopropyltri-ethoxysilane 12.2 g (0.075 mole) of pentaerythritol, 74.1 g (0.3 mole) of Dynasilane® A-1310 (from Witco) and 100 g of methoxypropyl acetate are mixed under a $N_2$ atmosphere in a three-necked flask equipped with a magnetic stirrer, an internal thermometer, a reflux condenser and an external heating device. The reaction mixture is stirred at 100° C. for 24 hours. A clear solution is formed. The solvent is distilled off at a pressure of 10 mbars and a temperature of 140° C. The product is obtained in the form of a clear, highly viscous liquid.

Yield: 59 g (70% of theory)

Molecular weight: 1124.15 g

Example 10

10.0 g of tetraethoxysilane (TEOS), 24 g of isopropanol, 17.5 g of Organosol (Bayer AG, a 30% colloidal solution of silicon dioxide in isopropanol) and 5.0 g of 0.1 N p-toluenesulphonic acid are added to 38.5 g of the multi-functional carbosilane produced in Example 9 in a beaker. The reaction mixture is stirred at 19° C. for 60 minutes. The viscosity of the agent according to the invention is 13 mPa·s at 23° C., and the pot life is approx. 7 hours.

Use Examples

The antifouling agents according to the invention are applied by brushing or pneumatic spraying at a spraying pressure of 4 bars through 2 crossed conduits to test plates measuring 650×250 mm and coated with a zinc-containing epoxy anti-corrosion ground coat (obtainable for example under the trade name Oldopox® 377–0066 from Relius Coatings) in a dry layer thickness of 50 μm and dried at room temperature for 7 days. The test plates were aged on a raft in Wilhelmshaven. After 3 months almost no fouling was detected on the panels. Fouling in the form of algae or barnacles was removable by rubbing lightly with a cloth.

The antifouling coatings according to the invention have high mechanical stability, high hardness (pencil hardness 3 H to 7 H) and adhere very firmly to the anti-corrosion ground coat employed.

What is claimed is:

1. An antifouling agent comprising:

(A) from 10 to 70% by weight of at least one multifunctional carbosilane and/or carbosiloxane of formula (I):

and/or a partial condensation product thereof, wherein
$R^1$ is a $C_1$–$C_{16}$ alkyl and/or $C_8$–$C_{20}$ aryl, wherein $R^1$ may represent radicals which are identical or different within the molecule,
X is OH, $C_1$–$C_4$ alkoxy, $C_8$–$C_{20}$ aryloxy, or $C_1$–$C_6$ acyloxy,
n is 0 to 2,
m is 2 to 6,
p is an integer $\geq 2$, and
Q is either (i) a linear or cyclic silane or siloxane or (ii) an unsubstituted hydrocarbon or a hydrocarbon in which at least one carbon atom is substituted with at least one member of the group consisting of O, N, S, and P, (B) from 10 to 40% by weight of one or more alkoxysilanes, (C) from 20 to 60% by weight of an organic solvent and/or water, (D) a catalyst, (E) from 3 to 15% by weight of inorganic nanoparticles, (F) from 0 to 30% by weight of other additives.

2. An antifouling agent according to claim 1, wherein the multifunctional carbosilane (A) is a silane of formula (II):

or a partial condensation product thereof, wherein
p is 4,3, or 2,
n is 0 to 2,
m is 2 to 6,
X' is methoxy or ethoxy,
$R^1$ is a $C_1$–$C_{18}$ alkyl and/or $C_6$–$C_{20}$ aryl, wherein $R^1$ may represent radicals which are identical or different within the molecule, and
$R^2$ denotes $C_1$–$C_{18}$ alkyl and/or $C_6$–$C_2$ aryl.

3. An antifouling agent according to claim 1, wherein the multifunctional carbosiloxane (A) is a siloxane containing at least two monofunctional, difunctional, and/or trifunctional and optional tetrafunctional siloxane units and/or a condensation product or partial condensation product thereof.

4. An antifouling agent according to claim 1, wherein the multifunctional carbosiloxane (A) is a compound of formula (III)

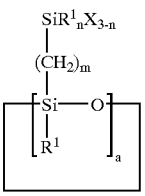

or a (partial) condensation product thereof, wherein
a is 3 to 6,
n is 0 to 2,
m is 2 to 6,
$R^1$ is a $C_1$–$C_{18}$ alkyl and/or $C_6$–$C_{20}$ aryl, wherein $R^1$ may represent radicals which are identical or different within the molecule, and
X is OH, methoxy, or ethoxy.

5. An antifouling agent according to claim 1, wherein the multifunctional carbosiloxane (A) is a compound of formula (IV)

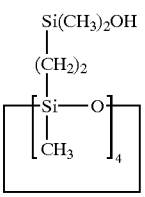

and/or a (partial) condensation product thereof, and/or a compound of formula (V)

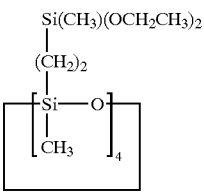

and/or a (partial) condensation product thereof.

6. An antifouling agent according to claim 1, wherein alkoxysilane (B) is at least one silane of formula (IX)

wherein
$R^4$ are monovalent $C_1$–$C_{14}$ alkyl or $C_8$–$C_{20}$ aryl radicals that are identical or different within the molecule and that are optionally substituted with at least one member of the group consisting of O, N, S, and P,
Y is a hydrolyzable group, and
b is 0, 1,2, or 3,
and/or a partial condensation product of at least one silane of formula (IX).

7. An antifouling agent according to claim 1, wherein alkoxysilane (B) is tetraethoxysilane or a condensation product of tetraethoxysilane.

8. An antifouling agent according to claim 1, wherein catalyst (D) is para-toluenesulfonic acid.

9. The antifouling agent according to claim 1, wherein the catalyst is present in an amount ranging from 0.01 to 2% by weight.

10. An antifouling agent according to claim 1, wherein inorganic nanoparticles (E) are a dispersion in an organic solvent of a silica sol with an average particle diameter of 5 to 100 nm.

11. A method for producing antifouling agent according to claim 1 comprising stirring together (A) at least one multifunctional carbosilane and/or carbosiloxane of the formula (I)

$$Q[(CH_2)_m SiR^1_n X_{(3-n)}]_p \qquad (I)$$

and/or a partial condensation product thereof, wherein
R$^1$ is a $C_1$–$C_{18}$ alkyl and/or $C_6$ $C_{20}$ aryl wherein R$^1$ may represent radicals which are identical or different within the molecule,
X is OH, $C_1$–$C_4$ alkoxy, $C_6$–$C_{20}$ aryloxy, or $C_1$–$C_6$ acyloxy,
n is 0 to 2,
m is 2 to 6,
p is an integer 2, and
Q is either (i) a linear or cyclic silane or siloxane or (ii) an unsubstituted hydrocarbon or a hydrocarbon in which at least one carbon atom is substituted with at least one member of the group consisting of O, N, S, and P, (B) from 10 to 40% by weight of one or more alkoxysilanes, (C) from 20 to 60% by weight of an organic solvent and/or water, (D) a catalyst, (E) from 3 to 15% by weight of inorganic nanoparticles, (F) from 0 to 30% by weight of other additives.

12. The method of claim 11, wherein the catalyst is present in an amount ranging from 0.01 to 2% by weight.

* * * * *